(12) United States Patent
Mukai et al.

(10) Patent No.: US 10,234,034 B2
(45) Date of Patent: Mar. 19, 2019

(54) PARKING LOCK APPARATUS

(71) Applicant: HONDA MOTOR CO., LTD., Tokyo (JP)

(72) Inventors: Tomoaki Mukai, Wako (JP); Shunsuke Yoshida, Wako (JP); Tetsuya Mochizuki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 78 days.

(21) Appl. No.: 15/461,481

(22) Filed: Mar. 17, 2017

(65) Prior Publication Data

US 2017/0268672 A1 Sep. 21, 2017

(30) Foreign Application Priority Data

Mar. 17, 2016 (JP) .................. 2016-054142

(51) Int. Cl.
| | |
|---|---|
| F16H 63/34 | (2006.01) |
| B60T 13/16 | (2006.01) |
| B60T 13/14 | (2006.01) |
| B60T 1/06 | (2006.01) |
| F16H 63/48 | (2006.01) |
| F16D 63/00 | (2006.01) |
| B60T 13/68 | (2006.01) |
| B60T 1/00 | (2006.01) |
| F16H 59/10 | (2006.01) |

(52) U.S. Cl.
CPC .......... *F16H 63/3433* (2013.01); *B60T 1/005* (2013.01); *B60T 1/062* (2013.01); *B60T 13/14* (2013.01); *B60T 13/16* (2013.01); *B60T 13/686* (2013.01); *F16D 63/006* (2013.01); *F16H 63/3425* (2013.01); *F16H 63/3483* (2013.01); *F16H 63/483* (2013.01); *F16H 59/10* (2013.01)

(58) Field of Classification Search
None
See application file for complete search history.

(56) References Cited

U.S. PATENT DOCUMENTS

| 7,934,590 B2* | 5/2011 | Duhaime ............. F16H 63/483 192/219.5 |
| 2014/0190784 A1* | 7/2014 | Yokota ............... F16H 63/3416 192/219.5 |
| 2017/0016535 A1* | 1/2017 | Tachibanada .......... F16H 61/12 |

FOREIGN PATENT DOCUMENTS

JP 2008-503695 2/2008

* cited by examiner

Primary Examiner — Mark A Manley
(74) Attorney, Agent, or Firm — Mori & Ward, LLP

(57) ABSTRACT

A parking lock apparatus includes a parking gear rotatable together with a rotating body of a transmission. A slider is to be switched between a parking lock position in which a parking pawl is in engagement with the parking gear and a parking release position in which the parking pawl is out of engagement with the parking gear. A hydraulic circuit includes a third oil passage through which a first line pressure is applied to push the slider toward the parking release position, a fourth oil passage through which a second line pressure is applied to push the slider toward the parking lock direction, and a hydraulic cut valve provided in the third oil passage to be opened when a difference between the first line pressure and the second line pressure is higher than or equal to a threshold pressure when applying line 20 Claims, 3 Drawing Sheets

PARKING LOCK APPARATUS

CROSS REFERENCE TO RELATED APPLICATIONS

The present application claims priority under 35 U.S.C. § 119 to Japanese Patent Application No. 2016-054142, filed Mar. 17, 2016, entitled "Parking Lock Apparatus for Vehicles." The contents of this application are incorporated herein by reference in their entirety.

BACKGROUND

1. Field

The present disclosure relates to a parking lock apparatus.

2. Description of the Related Art

There is a hitherto known parking lock apparatus that keeps a vehicle stopped by preventing the rotation of an output shaft of an automatic transmission thereof (see Japanese Unexamined Patent Application Publication (Translation of PCT Application) No. 2008-503695, for example). The parking lock apparatus is operated with a hydraulic actuator that is activated by a hydraulic circuit.

SUMMARY

According to one aspect of the present disclosure, there is provided a parking lock apparatus including a parking gear provided on a rotating body of a transmission; a parking pawl that is engageable with and disengageable from the parking gear; a slider whose state is switchable between an engaged state in which the parking pawl is in engagement with the parking gear and a disengaged state where the parking pawl is out of engagement with the parking gear; and a hydraulic circuit that controls the slider. The hydraulic circuit includes a first openable-and-closable valve capable of applying oil pressure to a first end of the slider such that the slider is moved to a parking-lock-disabling position; a second openable-and-closable valve capable of applying oil pressure to a second end of the slider such that the slider is moved to a parking-lock-enabling position; a first oil passage provided with the first openable-and-closable valve; a second oil passage provided with the second openable-and-closable valve; a third oil passage through which line pressure is applied to the first end of the slider; and a fourth oil passage through which line pressure is applied to the second end of the slider. The third oil passage is provided with a hydraulic cut valve that is opened when the oil pressure in the third oil passage is higher than or equal to a predetermined oil pressure that is determined by a difference, at a start of the hydraulic circuit, between the line pressure applied through the fourth oil passage to the second end of the slider and the line pressure applied through the third oil passage to the first end of the slider.

According to another aspect of the present disclosure, there is provided a parking lock apparatus including a parking gear provided on a rotating body of a transmission, a parking pawl that is engageable with and disengageable from the parking gear, a slider whose state is switchable between an engaged state in which the parking pawl is in engagement with the parking gear and a disengaged state where the parking pawl is out of engagement with the parking gear, and a hydraulic circuit that controls the slider. The hydraulic circuit includes a first openable-and-closable valve capable of applying oil pressure to a first end of the slider such that the slider is moved to a parking-lock-disabling position, a second openable-and-closable valve capable of applying oil pressure to a second end of the slider such that the slider is moved to a parking-lock-enabling position, a first oil passage provided with the first openable-and-closable valve, a second oil passage provided with the second openable-and-closable valve, a third oil passage through which line pressure is applied to the first end of the slider, and a fourth oil passage through which line pressure is applied to the second end of the slider. The third oil passage is provided with a first choke at which the third oil passage is narrowed such that, at a start of the hydraulic circuit, a rising characteristic of the line pressure applied through the third oil passage to the first end of the slider is lower than a rising characteristic of the line pressure applied through the fourth oil passage to the second end of the slider.

According to further aspect of the present disclosure, there is provided a parking lock apparatus including a parking gear provided on a rotating body of a transmission, a parking pawl that is engageable with and disengageable from the parking gear, a slider whose state is switchable between an engaged state in which the parking pawl is in engagement with the parking gear and a disengaged state where the parking pawl is out of engagement with the parking gear, and a hydraulic circuit that controls the slider. The hydraulic circuit includes a first openable-and-closable valve capable of applying oil pressure to a first end of the slider such that the slider is moved to a parking-lock-disabling position, a second openable-and-closable valve capable of applying oil pressure to a second end of the slider such that the slider is moved to a parking-lock-enabling position, a first oil passage provided with the first openable-and-closable valve, a second oil passage provided with the second openable-and-closable valve, a third oil passage through which line pressure is applied to the first end of the slider, and a fourth oil passage through which line pressure is applied to the second end of the slider. The first oil passage is provided with a second choke at which the first oil passage is narrowed such that, at a start of the hydraulic circuit, a rising characteristic of the line pressure applied through the first oil passage to the first end of the slider is lower than a rising characteristic of the line pressure applied through the second oil passage to the second end of the slider.

According to further aspect of the present disclosure, a parking lock apparatus includes a parking gear, a parking pawl, a slider, and a hydraulic circuit. The parking gear is provided to be rotatable together with a rotating body of a transmission. The parking pawl is provided to be engageable with and disengageable from the parking gear. The slider is to be switched between a parking lock position and a parking release position. The parking pawl is in engagement with the parking gear in the parking lock position. The parking pawl is out of engagement with the parking gear in the parking release position. The hydraulic circuit is to control the slider. The hydraulic circuit includes a first switching valve, a second switching valve, a first oil passage, a second oil passage, a third oil passage, a fourth oil passage, and a hydraulic cut valve. The first switching valve is to apply oil pressure to the slider to move the slider to the parking release position. The second switching valve is to apply oil pressure to the slider to move the slider to the parking lock position. The first oil passage connects the first switching valve and the slider. The second oil passage connects the second switching valve and the slider. The third oil passage is connected to the slider and a first line pressure is applied to push the slider toward the parking release position through the third oil passage. The fourth oil passage is connected to the slider and a second line pressure is applied to push the slider toward the parking lock direction through the fourth oil passage. The hydraulic cut valve is provided in the third oil passage to be opened when a difference between the first line pressure and the second line pressure is higher than or equal to a threshold pressure when applying line pressure to the hydraulic circuit is started.

According to further aspect of the present disclosure, a parking lock apparatus includes a parking gear, a parking pawl, a slider, and a hydraulic circuit. The parking gear is provided to be rotatable together with a rotating body of a transmission. The parking pawl is provided to be engageable with and disengageable from the parking gear. The slider is to be switched between a parking lock position and a parking release position. The parking pawl is in engagement with the parking gear in the parking lock position. The parking pawl is out of engagement with the parking gear in the parking release position. The hydraulic circuit is to control the slider. The hydraulic circuit includes a first switching valve, a second switching valve, a first oil passage, a second oil passage, a third oil passage, a fourth oil passage, and a first choke. The first switching valve is to apply oil pressure to the slider to move the slider to the parking release position. The second switching valve is to apply oil pressure to the slider to move the slider to the parking lock position. The first oil passage connects the first switching valve and the slider. The second oil passage connects the second switching valve and the slider. The third oil passage is connected to the slider and a first line pressure is applied to push the slider toward the parking release position through the third oil passage. The fourth oil passage is connected to the slider and a second line pressure is applied to push the slider toward the parking lock direction through the fourth oil passage. The first choke is provided in the third oil passage to narrow the third oil passage such that a rising characteristic of the first line pressure is lower than a rising characteristic of the second line pressure when applying line pressure to the hydraulic circuit is started.

According to further aspect of the present disclosure, a parking lock apparatus includes a parking gear, a parking pawl, a slider, and a hydraulic circuit. The parking gear is provided to be rotatable together with a rotating body of a transmission. The parking pawl is provided to be engageable with and disengageable from the parking gear. The slider is to be switched between a parking lock position and a parking release position. The parking pawl is in engagement with the parking gear in the parking lock position. The parking pawl is out of engagement with the parking gear in the parking release position. The hydraulic circuit is to control the slider. The hydraulic circuit includes a first switching valve, a second switching valve, a first oil passage, a second oil passage, a third oil passage, a fourth oil passage, and a second choke. The first switching valve is to apply oil pressure to the slider to move the slider to the parking release position. The second switching valve is to apply oil pressure to the slider to move the slider to the parking lock position. The first oil passage connects the first switching valve and the slider. The second oil passage connects the second switching valve and the slider. The third oil passage is connected to the slider and line pressure is applied to push the slider toward the parking release position through the third oil passage. The fourth oil passage is connected to the slider and line pressure is applied to push the slider toward the parking lock direction through the fourth oil passage. The second choke is provided in the first oil passage to narrow the first oil passage such that a rising characteristic of a third line pressure applied through the first oil passage is lower than a rising characteristic of a fourth line pressure applied through the second oil passage when applying line pressure to the hydraulic circuit is started.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
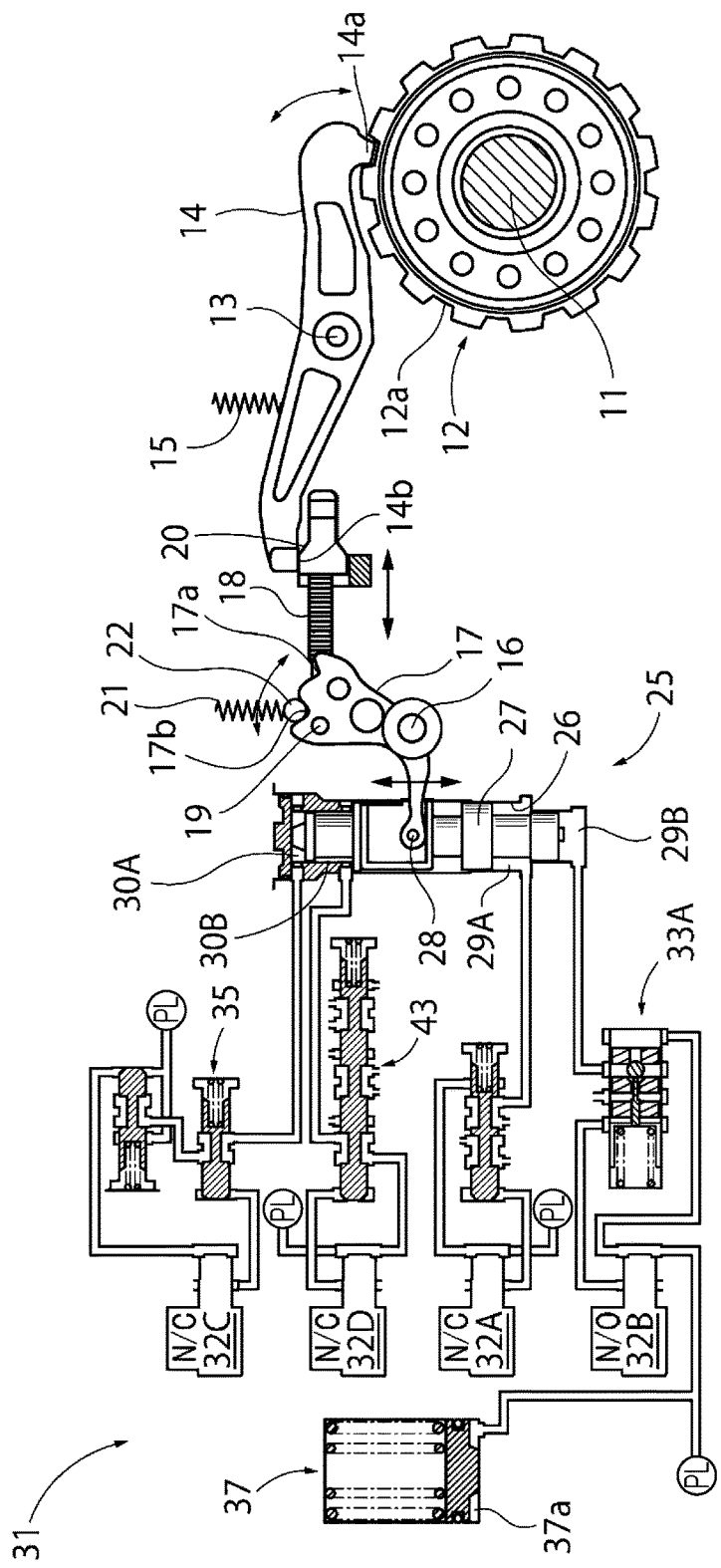
FIG. 1 illustrates a parking lock apparatus according to an embodiment of the present disclosure.

The embodiment(s) will now be described with reference to the accompanying drawings, wherein like reference numerals designate corresponding or identical elements throughout the various drawings.

A parking lock apparatus according to an embodiment of the present disclosure will now be described with reference to FIGS. 1 to 3.

Referring to FIG. 1, the parking lock apparatus according to the present embodiment includes a parking gear 12 fixed to an output shaft 11 of an automatic transmission, and a parking pawl 14 pivoted by a spindle 13. The parking pawl 14 is provided at a first end thereof with a catch 14a.

Figure 2:
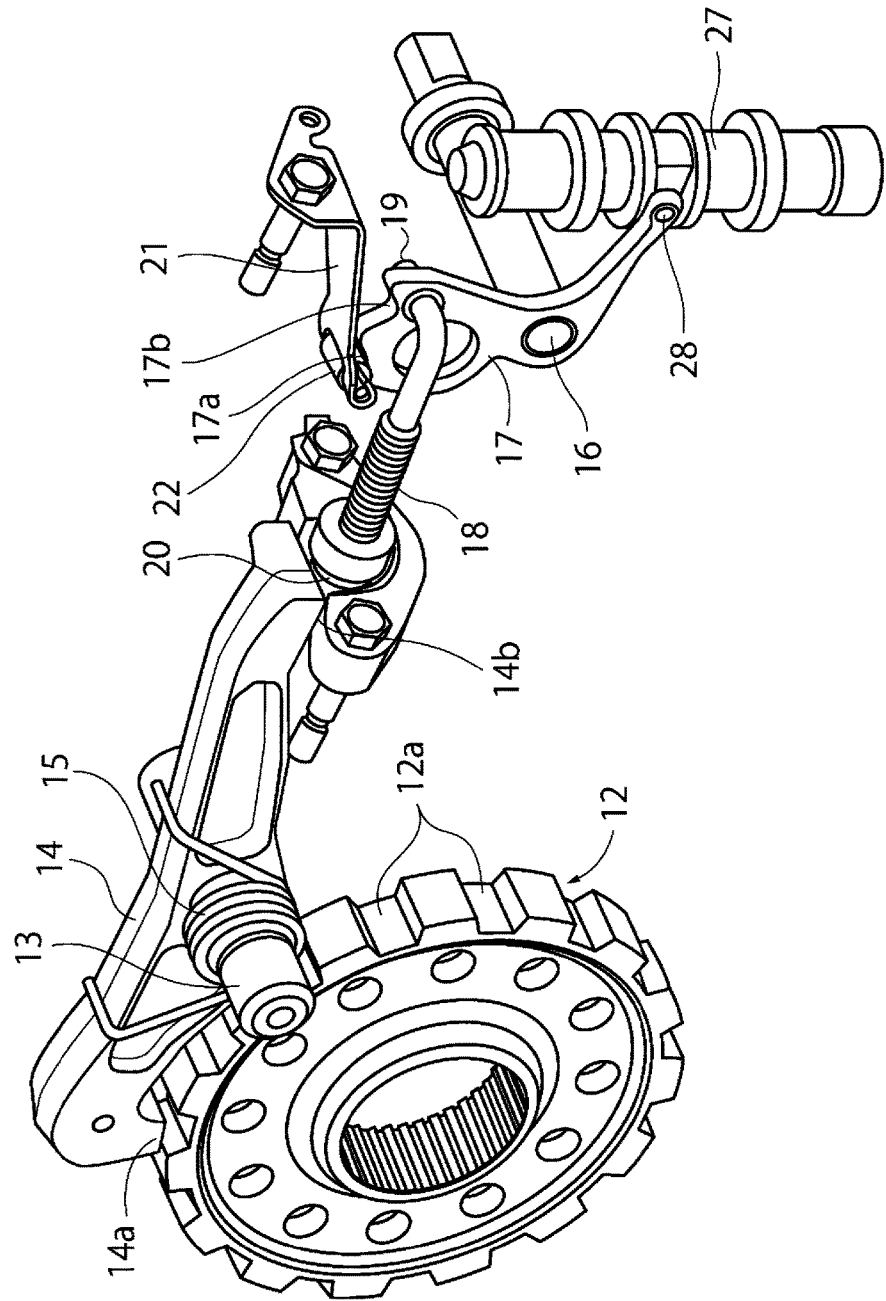
FIG. 2 is a perspective view of a part of the parking lock apparatus according to the embodiment.

Referring to FIG. 2, the parking pawl 14 is urged by a spring 15 in such a direction that the catch 14a thereof goes out of a relevant one of tooth spaces 12a of the parking gear 12.

The parking lock apparatus further includes a detent plate 17 pivoted by a spindle 16, and a parking rod 18 pivoted at a first end thereof by a pin 19 fitted in the detent plate 17. The parking rod 18 is provided at a second end thereof with a conical cam 20. The parking pawl 14 is provided at a second end thereof with a cam follower 14b. The cam 20 is movably in contact with the cam follower 14b.

The detent plate 17 has two recesses 17a and 17b at a second end thereof. Either of the recesses 17a and 17b receives a detent roller 22 provided at a first end of a swingable arm 21. The detent roller 22 engages with the recess 17a or 17b by being urged with an elastic force exerted by the arm 21 itself. That is, the arm 21 functions as a leaf spring. Alternatively, a spring that is separate from the arm 21 and urges the detent roller 22 may be provided. A first end of the detent plate 17 is connected to a piston 27 with a pin 28.

The piston 27 is slidably fitted in a cylinder 26. A first locking oil chamber 29A and a second locking oil chamber 29B for moving the piston 27 in such a direction (upward) that parking lock is enabled are provided at the lower end of the cylinder 26. A first unlocking oil chamber 30A and a second unlocking oil chamber 30B for moving the piston 27 in such a direction (downward) that parking lock is disabled are provided at the upper end of the cylinder 26.

When oil pressure is applied to the first locking oil chamber 29A and to the second locking oil chamber 29B, the piston 27 moves upward. The movement of the piston 27 moves the cam 20 forward through intermediaries of the detent plate 17 and the parking rod 18, whereby the cam follower 14b of the parking pawl 14 is lifted up.

The parking pawl 14, with the cam follower 14b thereof lifted up by the cam 20, swings about the spindle 13 against the elastic force of the spring 15. Hence, the catch 14a engages with one of the tooth spaces 12a of the parking gear 12. Thus, parking lock is enabled, so that the vehicle is restrained from moving. When parking lock is enabled, the detent roller 22 engages with the recess 17b of the detent plate 17 and is kept in engagement therewith stably.

On the other hand, when oil pressure is applied to the first unlocking oil chamber 30A and to the second unlocking oil chamber 30B, the piston 27 moves downward. Then, the catch 14a of the parking pawl 14 moves away from the tooth space 12a of the parking gear 12. Thus, parking lock is disabled, allowing the vehicle to move. When parking lock is disabled, the detent roller 22 engages with the recess 17a of the detent plate 17 and is kept in engagement therewith stably.

Figure 3:
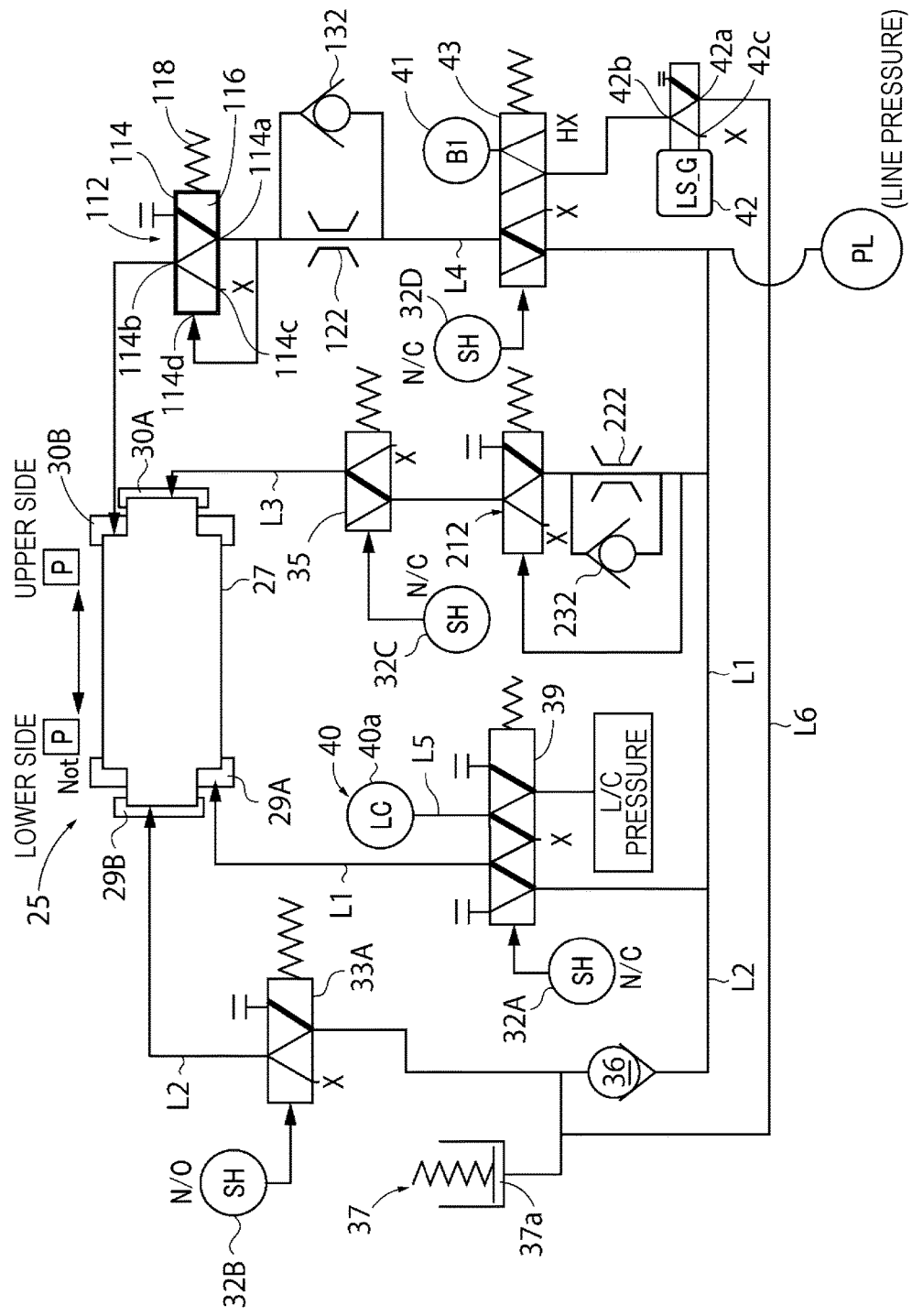
FIG. 3 illustrates a hydraulic circuit of the parking lock apparatus according to the embodiment.

Referring now to FIG. 3, a hydraulic circuit 31 that controls the operation of the piston 27 will be described. The hydraulic circuit 31 according to the present embodiment also functions as a hydraulic circuit of a transmission that hydraulically controls devices, such as a clutch or a brake, of the transmission.

The hydraulic circuit 31 includes an on/off solenoid valve 32A that applies line pressure, which is generated by a hydraulic pump (not illustrated) and is applied to an oil passage L1, to the first locking oil chamber 29A. The hydraulic circuit 31 further includes an on/off solenoid valve 32B that applies line pressure in an oil passage L2 to the second locking oil chamber 29B. The oil passage L2 is connected to a downstream point of the oil passage L1 and is provided with a check valve 36. The solenoid valve 32A directly applies the line pressure to the first locking oil chamber 29A when opened. The solenoid valve 32B opens a first ball valve 33A when opened. The solenoid valve 32A is normally closed, whereas the solenoid valve 32B is normally open.

The hydraulic circuit 31 further includes an on/off solenoid valve 32C that applies line pressure to the first unlocking oil chamber 30A through an oil passage L3, and an on/off solenoid valve 32D that applies line pressure in an oil passage L4 to the second unlocking oil chamber 30B. The oil passage L4 branches off at a point on the upstream side with respect to the check valve 36.

In the known art, the line pressure from the solenoid valve 32D is directly applied to the second unlocking oil chamber 30B. In the parking lock apparatus according to the present embodiment, the oil passage L4 (corresponding to the third oil passage according to the present disclosure) is provided with a hydraulic cut valve 112.

The hydraulic cut valve 112 includes a cylinder 114, a spool 116 slidably fitted in the cylinder 114, and a spring 118 that urges the spool 116 toward one side (the left side in FIG. 3) of the cylinder 114.

The cylinder 114 has, on the outer periphery thereof, an input port 114a to which the line pressure in the oil passage L4 is inputted, an output port 114b, and a drain port 114c. Furthermore, the cylinder 114 has a switching port 114d at a first end (the left end in FIG. 3) thereof. The switching port 114d is connected to a passage branching off from the oil passage L4. The line pressure is applied to the first end of the cylinder 114 through the switching port 114d.

In the hydraulic cut valve 112, when the line pressure is raised to a predetermined level at which the spool 116 is moved against the urging force of the spring 118, the input port 114a and the output port 114b communicate with each other with the movement of the spool 116, whereby the hydraulic cut valve 112 is opened. Accordingly, the line pressure is applied to the second unlocking oil chamber 30B. Conversely, when the line pressure is below the predetermined level, the output port 114b and the drain port 114c communicate with each other, whereby the oil pressure applied to the second unlocking oil chamber 30B is released through the drain port 114c.

According to the present embodiment, the spring 118 of the hydraulic cut valve 112 is set such that the hydraulic cut valve 112 is opened when the oil pressure is higher than or equal to the predetermined level. The predetermined level of oil pressure is determined by the difference in the rising edge, at the start of the hydraulic circuit 31 such as when the power of the vehicle is turned on, between the line pressure applied to the first locking oil chamber 29A at the lower end (corresponding to the second end according to the present disclosure) of the piston 27 through the oil passage L1 (corresponding to the fourth oil passage according to the present disclosure) and the line pressure applied to the second unlocking oil chamber 30B at the upper end (corresponding to the first end according to the present disclosure) of the piston 27 through the oil passage L4.

Hence, even if there is a difference between the rising edge of the line pressure in the oil passage L1 and the rising edge of the line pressure in the oil passage L4 at the start of the hydraulic circuit 31, the line pressure in the oil passage L4 is prevented from rising before the line pressure in the oil passage L1 rises. Such a configuration prevents a malfunction of the piston 27 that may be caused by the difference in the rising characteristic between the two line pressures: specifically, a misactivation of the piston 27 to a parking-lock-disabling position (a parking release position) despite an instruction to move the piston 27 to a parking-lock-enabling position (a parking lock position).

Thus, a quick response to the operation performed by the driver is realized with no waiting time for the piston 27 to return to the parking-lock-enabling position. Note that the hydraulic circuit 31 of the parking lock apparatus according to the present embodiment includes an accumulator 37. In such a configuration, the rising of the line pressure in the second locking oil chamber 29B tends to be slow when the pressure is being accumulated in the accumulator 37. Therefore, the present embodiment is particularly effective when applied to a parking lock apparatus including the above hydraulic circuit 31.

Furthermore, the oil passage L4 is provided, on the upstream side with respect to the hydraulic cut valve 112, with a first choke 122 where the oil passage L4 is narrowed. The hydraulic circuit 31 is formed of two valve bodies each having an oil passage on one side thereof. The two valve bodies are combined together such that the respective oil passages face each other, with a separating plate having a slot that allows the oil passages to communicate with each other interposed between the two valve bodies. The first choke 122 according to the present embodiment is provided as the slot of the separating plate. Since the first choke 122 also serves as the slot of the separating plate, there is no need to provide an additional member serving as the first choke. Consequently, the number of components can be reduced, and the process of assembling the parking lock apparatus can be simplified.

The oil passage L4 is further provided with a first check valve 132 in parallel with the first choke 122. The first check valve 132 prevents the application of oil pressure to the second unlocking oil chamber 30B but allows the oil pressure in the second unlocking oil chamber 30B to be released through the hydraulic cut valve 112. Since the first check valve 132 is provided, the oil pressure can be released quickly.

When the solenoid valve 32C is opened, a spool of a parking-inhibiting valve 35 is moved to the right in FIG. 3 against the urging force of a spring, whereby the line pressure is applied to the first unlocking oil chamber 30A. Conversely, when the solenoid valve 32C is closed, the spool of the parking-inhibiting valve 35 is moved to the left in FIG. 3 by the urging force of the spring, whereby the line pressure applied to the first unlocking oil chamber 30A is drained. The solenoid valve 32C is normally closed. The solenoid valve 32D is normally closed.

The oil passage L3 is provided, on the upstream side with respect to the parking-inhibiting valve 35, with a second choke 222 where the oil passage L3 is narrowed. The second choke 222 is provided as a slot of a separating plate. Since the second choke 222 also serves as the slot of the separating plate, there is no need to provide an additional member serving as the second choke. Consequently, the number of components can be reduced, and the process of assembling the parking lock apparatus can be simplified.

The oil passage L3 is further provided with a second check valve 232 in parallel with the second choke 222. The second check valve 232 prevents the application of oil pressure to the first unlocking oil chamber 30A but allows the oil pressure in the first unlocking oil chamber 30A to be released. Since the second check valve 232 is provided, the oil pressure can be released quickly.

Note that the hydraulic circuit 31 of the parking lock apparatus according to the present embodiment includes the accumulator 37. In such a configuration, the rising of the line pressure in the second locking oil chamber 29B tends to be slow when the pressure is being accumulated in the accumulator 37. Therefore, the present embodiment is particularly effective when applied to a parking lock apparatus including the above hydraulic circuit 31.

Furthermore, the oil passage L3 is provided with a hydraulic cut valve 212 between the parking-inhibiting valve 35 and the second choke 222. The hydraulic cut valve 212 has the same configuration as the hydraulic cut valve 112.

The accumulator 37 includes an accumulating chamber 37a that is connected to a point of the oil passage L2 between the check valve 36 and the solenoid valve 32B.

A lockup-clutch shift valve 39 is connected to a point of the oil passage L1 on the downstream side with respect to the solenoid valve 32A. Lockup-clutch pressure in an oil passage L5 is applied to a lockup clutch 40a of a torque converter 40, which is a starting mechanism, through the lockup-clutch shift valve 39.

An oil passage L6 is provided on the downstream side of the check valve 36 and is connected to a hydraulic brake 41, which is a hydraulically engageable device for gear shift. The oil passage L6 is provided with a linear solenoid valve 42 and a brake cut valve 43. The brake cut valve 43 is opened and closed by the solenoid valve 32D. The linear solenoid valve 42 has an input port 42a, an output port 42b, and a drain port 42c. The linear solenoid valve 42 adjusts the oil pressure inputted thereto from the input port 42a and outputs the adjusted oil pressure from the output port 42b or releases the oil pressure from the output port 42b via the drain port 42c.

Operations according to the embodiment of the present disclosure employing the above configuration will now be described.

When the driver has selected a drive (D) range or a reverse (R) range by operating a shifting portion such as a shift lever and the vehicle is traveling in a predetermined gear range, the line pressure generated by the hydraulic pump driven by an internal combustion engine is transmitted to the oil passage L1 and to the oil passage L3. The oil pressure in the oil passage L1 is transmitted through the check valve 36 to the oil passage L2 and to the oil passage L6, and is also transmitted to the oil passage L4. The line pressure transmitted to the oil passage L2 is transmitted to and is accumulated in the accumulating chamber 37a of the accumulator 37.

The solenoid valve 32C, which is normally closed, is opened with excitation when energized. The solenoid valve 32D, which is normally closed, is opened with excitation when energized. When the solenoid valve 32C is opened, the spool of the parking-inhibiting valve 35 is moved to the right in FIG. 3. Accordingly, the line pressure in the oil passage L3 is transmitted through the parking-inhibiting valve 35 to the first unlocking oil chamber 30A, which is included in a hydraulic actuator 25. Furthermore, when the solenoid valve 32D is opened, the line pressure in the oil passage L4 is transmitted to the second unlocking oil chamber 30B.

The solenoid valve 32A, which is normally closed, is closed when de-energized. The solenoid valve 32B, which is normally open, is closed with excitation when energized. When the solenoid valve 32A is closed, the oil in the first locking oil chamber 29A of the hydraulic actuator 25 is drained through the solenoid valve 32A. On the other hand, when the solenoid valve 32B is closed, the first ball valve 33A is closed. Accordingly, the oil in the second locking oil chamber 29B is drained through the first ball valve 33A. Consequently, the piston 27 is moved to the left in FIG. 3, whereby parking lock is disabled.

The amount of oil that is allowed to flow through the solenoid valve 32B is relatively small, whereas the amount of oil that is allowed to flow through the first ball valve 33A that is opened and closed by the solenoid valve 32B is relatively large. That is, the provision of the first ball valve 33A increases the responsiveness of the piston 27.

As described above, while the vehicle is traveling, the solenoid valve 32A and the solenoid valve 32B are closed whereas the solenoid valve 32C and the solenoid valve 32D are open. Thus, the piston 27 is retained at the parking-lock-disabling position, so that parking lock is disabled.

The parking lock apparatus includes two locking oil chambers: namely, the first locking oil chamber 29A and the second locking oil chamber 29B; and two unlocking oil chambers: namely, the first unlocking oil chamber 30A and the second unlocking oil chamber 30B. Therefore, even if one of the solenoid valve 32C and the solenoid valve 32D is stuck in the closed state and the application of oil pressure to the first unlocking oil chamber 30A or the second unlocking oil chamber 30B is accidentally stopped, or even if one of the solenoid valve 32A and the solenoid valve 32B is stuck in the open state and oil pressure is accidentally applied to the first locking oil chamber 29A or the second locking oil chamber 29B, the hydraulic actuator 25 can operate at the parking-lock-disabling position without problems, providing satisfactory redundancy.

The solenoid valve 32C is opened in a first predetermined gear range. The solenoid valve 32D is opened in a second predetermined gear range. The first predetermined gear range and the second predetermined gear range partially overlap each other. Hence, in accordance with the gear range established at the time of interest, the following cases are expected to occur: a case where the line pressure is applied only to the first unlocking oil chamber 30A, a case where the line pressure is applied only to the second unlocking oil chamber 30B, and a case where the line pressure is applied to both the first unlocking oil chamber 30A and the second unlocking oil chamber 30B. In any of the three cases, there is no problem because the piston 27 is moved to the left in FIG. 3 and parking lock is disabled. In the overlapping part between the first and second gear ranges, the line pressure is applied to both the first unlocking oil chamber 30A and the second unlocking oil chamber 30B. Therefore, even if the solenoid valve 32C or the solenoid valve 32D has a failure and the application of the line pressure is stopped, parking lock is kept disabled, providing increased redundancy.

If the shifting portion such as a shift lever is moved to a parking (P) range and the vehicle is thus stopped while the internal combustion engine is in operation, the solenoid valve 32A and the solenoid valve 32B are opened whereas the solenoid valve 32C and the solenoid valve 32D are closed. Since the solenoid valve 32A is opened, the line pressure in the oil passage L1 is transmitted to the first locking oil chamber 29A of the hydraulic actuator 25. Furthermore, since the solenoid valve 32B is opened, the first ball valve 33A is opened, whereby the line pressure in the oil passage L2 is transmitted to the second locking oil chamber 29B of the hydraulic actuator 25.

Meanwhile, since the solenoid valve 32C is closed, the operating oil in the first unlocking oil chamber 30A of the hydraulic actuator 25 is drained through the parking-inhibiting valve 35. Furthermore, since the solenoid valve 32D is closed, the operating oil in the second unlocking oil chamber 30B of the hydraulic actuator 25 is drained through the solenoid valve 32D. Consequently, the piston 27 moves to the right in FIG. 3, whereby parking lock is enabled.

As described above, if the P range is selected with the shifting portion while the internal combustion engine is in operation, the solenoid valve 32A and the solenoid valve 32B are opened whereas the solenoid valve 32C and the solenoid valve 32D are closed. Thus, the piston 27 can be moved to the parking-lock-enabling position. The parking lock apparatus includes two locking oil chambers: namely, the first locking oil chamber 29A and the second locking oil chamber 29B; and two unlocking oil chambers: namely, the first unlocking oil chamber 30A and the second unlocking oil chamber 30B. Therefore, even if one of the solenoid valve 32C and the solenoid valve 32D is stuck in the open state and oil pressure is accidentally applied to the first unlocking oil chamber 30A or the second unlocking oil chamber 30B, or even if one of the solenoid valve 32A and the solenoid valve 32B is stuck in the closed state and the application of oil pressure to the first locking oil chamber 29A or the second locking oil chamber 29B is accidentally stopped, the hydraulic actuator 25 can operate at the parking-lock-enabling position without problems, providing satisfactory redundancy.

When the ignition (the power of the vehicle) is turned off by operating the shifting portion to the P range, the internal combustion engine stops, whereby the line pressure from the pump that is driven by the internal combustion engine is removed. Nevertheless, according to the embodiment, the oil pressure accumulated in the accumulator 37 can activate the parking lock apparatus without problems.

That is, when the ignition is turned off, the solenoid valve 32A that is normally closed, the solenoid valve 32B that is normally open, the solenoid valve 32C that is normally closed, and the solenoid valve 32D that is normally closed are all opened. Even if the line pressure is removed, the oil pressure accumulated in the accumulator 37 is prevented from being released and is retained by the check valve 36.

Furthermore, since the solenoid valve 32B is opened, the oil pressure in the accumulator 37 is transmitted to the second locking oil chamber 29B. Meanwhile, since the solenoid valve 32C is closed, the operating oil in the first unlocking oil chamber 30A is drained through the parking-inhibiting valve 35. Furthermore, since the solenoid valve 32D is closed, the operating oil in the second unlocking oil chamber 30B is drained through the solenoid valve 32D. Consequently, the piston 27 moves to the right in FIG. 3, whereby parking lock is enabled.

Thus, even if the ignition is turned off by selecting the P range with the shifting portion and the line pressure is thus removed, the oil pressure accumulated in the accumulator 37 can activate the parking lock apparatus without problems.

The vehicle according to the embodiment has a function of idling-stop control. Specifically, when the vehicle temporarily stops at the stoplight or the like, the internal combustion engine stops. Accordingly, the pump stops, whereby the line pressure is removed. In such an idling-stop state, the oil pressure accumulated in the accumulator 37 is retained therein, without leaking therefrom, by the check valve 36. Since the line pressure is removed, the oil pressure in the first unlocking oil chamber 30A and the oil pressure in the second unlocking oil chamber 30B are also removed. However, since the detent plate 17 and the detent roller 22 are in engagement with each other, parking lock is kept disabled.

When the internal combustion engine is restarted at the recovery from the idling-stop state, the line pressure does not rise quickly. Therefore, the quick start of the vehicle may be hindered because oil pressure might not be applied quickly to the hydraulic brake 41, which is a hydraulically engageable device that is necessary for starting the vehicle. However, in the parking lock apparatus according to the embodiment, the oil pressure retained in the accumulator 37 in the idling-stop state allows the hydraulic brake 41 to activate without delay.

To be more specific, simultaneously with the recovery from the idling-stop state, the oil pressure accumulated in the accumulator 37 is applied to the oil passage L2 and to the oil passage L6. At this point of time, the solenoid valve 32D provided to the oil passage L4 is closed because the power supply is being stopped. Accordingly, the spool of the brake cut valve 43 is positioned on the left side in FIG. 3. Hence, if the linear solenoid valve 42 provided to the oil passage L6 is opened to a predetermined degree of opening, the oil pressure accumulated in the accumulator 37 can be applied to the hydraulic brake 41, whereby the vehicle can be started quickly.

While the operation of the hydraulic brake 41 at the recovery from the idling-stop state has been described above, the hydraulic brake 41 is also controllable by activating the brake cut valve 43 with the solenoid valve 32D while the vehicle is normally travelling. If the solenoid valve 32D is closed so that the spool of the brake cut valve 43 is moved to the left in FIG. 3 and the linear solenoid valve 42 and the hydraulic brake 41 are thus isolated from each other, the application of oil pressure to the second unlocking oil chamber 30B is stopped. However, the oil pressure is still applied to the first unlocking oil chamber 30A. Hence, the piston 27 is retained at the parking-lock-disabling position, and there is no chance that parking lock is enabled.

The solenoid valve 32A according to the embodiment is also used for activating the lockup clutch 40a of the torque converter 40. Specifically, the solenoid valve 32A operates as follows. While the vehicle is travelling, the solenoid valve 32A is closed and the spool of the lockup-clutch shift valve 39 is therefore positioned on the right side in FIG. 3. Accordingly, lockup-clutch pressure is applied to the lockup clutch 40a of the torque converter 40. If the solenoid valve 32A is opened in this state, the spool of the lockup-clutch shift valve 39 moves to the right in FIG. 3 and the oil pressure in the lockup clutch 40a is drained, whereby the lockup clutch 40a is disengaged.

If the solenoid valve 32A is opened, the line pressure is applied to the first locking oil chamber 29A. However, in the above state, since the line pressure is already applied to both the first unlocking oil chamber 30A and the second unlocking oil chamber 30B, there is no chance that the piston 27 moves to the parking-lock-enabling position even if the line pressure is applied to the first locking oil chamber 29A. Hence, there is no chance that parking lock is enabled.

To summarize, in the parking lock apparatus according to the embodiment, the solenoid valve 32A and the solenoid valve 32D that control the operation of the piston 27 are also used for controlling the lockup clutch 40a of the torque converter 40 and for controlling the hydraulic brake 41, respectively. Therefore, the number of solenoid valves can be reduced, and the configuration of the hydraulic circuit 31 can thus be simplified. Moreover, since the accumulator 37 is used not only for enabling parking lock but also for activating the hydraulic brake 41, which is a hydraulically engageable device, at the time of recovery from the idling-stop state, the number of accumulators can be reduced, which further simplifies the configuration of the hydraulic circuit 31.

While an embodiment of the present disclosure has been described above, various design changes can be made to the present disclosure without departing from the essence thereof.

For example, the number of openable-and-closable valves (switching valves or second solenoid valves and third solenoid valves) according to the present disclosure is not limited to two, such as the solenoid valve 32A and the solenoid valve 32B employed in the above embodiment, and may be one or three or more.

Furthermore, the number of unlocking solenoid valves (first solenoid valves) is not limited to two, such as the solenoid valve 32C and the solenoid valve 32D employed in the above embodiment, and may be one or three or more.

While the solenoid valve 32A according to the above embodiment also serves as a solenoid valve that applies oil pressure to the lockup clutch 40a of the torque converter 40, the solenoid valve 32B may serve as that solenoid valve. Alternatively, the solenoid valve 32A (or the solenoid valve 32B) may also serve as a solenoid valve that applies oil pressure to the hydraulic brake 41. That is, the solenoid valve 32A or the solenoid valve 32B may also serve as a solenoid valve that applies oil pressure to the starting mechanism or a solenoid valve that applies oil pressure to any of a plurality of hydraulically engageable devices.

Moreover, the hydraulically engageable device is not limited to the hydraulic brake 41 employed in the above embodiment and may be another device such as a hydraulic clutch.

Furthermore, the starting mechanism is not limited to the torque converter 40 employed in the above embodiment and may be another mechanism such as a starting clutch.

According to a first aspect of the present disclosure, there is provided a parking lock apparatus (for example, the parking lock apparatus according to the embodiment, which applies throughout the following) including a parking gear (for example, the parking gear 12 according to the embodiment, which applies throughout the following) provided on a rotating body (for example, the output shaft 11 according to the embodiment, which applies throughout the following) of a transmission; a parking pawl (for example, the parking pawl 14 according to the embodiment, which applies throughout the following) that is engageable with and disengageable from the parking gear; a slider (for example, the piston 27 according to the embodiment, which applies throughout the following) whose state is switchable between an engaged state in which the parking pawl is in engagement with the parking gear and a disengaged state where the parking pawl is out of engagement with the parking gear; and a hydraulic circuit (for example, the hydraulic circuit 31 according to the embodiment, which applies throughout the following) that controls the slider. The hydraulic circuit includes a first openable-and-closable valve (for example, the solenoid valve 32C according to the embodiment, which applies throughout the following) capable of applying oil pressure to a first end of the slider such that the slider is moved to a parking-lock-disabling position; a second openable-and-closable valve (for example, the solenoid valve 32B according to the embodiment, which applies throughout the following) capable of applying oil pressure to a second end of the slider such that the slider is moved to a parking-lock-enabling position; a first oil passage (for example, the oil passage L3 according to the embodiment, which applies throughout the following) provided with the first openable-and-closable valve; a second oil passage (for example, the oil passage L2 according to the embodiment, which applies throughout the following) provided with the second openable-and-closable valve; a third oil passage (for example, the oil passage L4 according to the embodiment, which applies throughout the following) through which line pressure is applied to the first end of the slider; and a fourth oil passage (for example, the oil passage L1 according to the embodiment, which applies throughout the following) through which line pressure is applied to the second end of the slider. The third oil passage is provided with a hydraulic cut valve that is opened when the oil pressure in the third oil passage is higher than or equal to a predetermined oil pressure that is determined by a difference, at a start of the hydraulic circuit, between the line pressure applied through the fourth oil passage to the second end of the slider and the line pressure applied through the third oil passage to the first end of the slider.

In the parking lock apparatus according to the first aspect of the present disclosure, even if there is a difference between the rising edge of the line pressure in the fourth oil passage and the rising edge of the line pressure in the third oil passage at the start of the hydraulic circuit, the line pressure in the third oil passage is prevented from rising before the line pressure in the fourth oil passage rises.

Thus, the occurrence of a malfunction of the slider that may be caused by the difference in the rising characteristic between the two line pressures can be prevented.

According to a second aspect of the present disclosure, there is provided a parking lock apparatus including a parking gear provided on a rotating body of a transmission, a parking pawl that is engageable with and disengageable from the parking gear, a slider whose state is switchable between an engaged state in which the parking pawl is in engagement with the parking gear and a disengaged state where the parking pawl is out of engagement with the parking gear, and a hydraulic circuit that controls the slider. The hydraulic circuit includes a first openable-and-closable valve capable of applying oil pressure to a first end of the slider such that the slider is moved to a parking-lock-disabling position, a second openable-and-closable valve capable of applying oil pressure to a second end of the slider such that the slider is moved to a parking-lock-enabling position, a first oil passage provided with the first openable-and-closable valve, a second oil passage provided with the second openable-and-closable valve, a third oil passage through which line pressure is applied to the first end of the slider, and a fourth oil passage through which line pressure is applied to the second end of the slider. The third oil passage is provided with a first choke at which the third oil passage is narrowed such that, at a start of the hydraulic circuit, a rising characteristic of the line pressure applied through the third oil passage to the first end of the slider is lower than a rising characteristic of the line pressure applied through the fourth oil passage to the second end of the slider.

According to the second aspect of the present disclosure, the occurrence of a malfunction of the slider that may be caused if the line pressure in the third oil passage rises before the line pressure in the fourth oil passage rises can be prevented.

In the second aspect of the present disclosure, it is preferable that the third oil passage be provided with a first check valve in parallel with the first choke and that the first check valve prevent the oil pressure from being applied to the first end of the slider and allow the oil pressure applied to the first end of the slider to be released. In such a configuration, the oil pressure applied to the first end of the slider can be released quickly.

In the second aspect of the present disclosure, it is also preferable that the first choke be a slot provided in a separating plate. In such a configuration, there is no need to provide an additional member serving as the first choke. Consequently, the number of components can be reduced.

According to a third aspect of the present disclosure, there is provided a parking lock apparatus including a parking gear provided on a rotating body of a transmission, a parking pawl that is engageable with and disengageable from the parking gear, a slider whose state is switchable between an engaged state in which the parking pawl is in engagement with the parking gear and a disengaged state where the parking pawl is out of engagement with the parking gear, and a hydraulic circuit that controls the slider. The hydraulic circuit includes a first openable-and-closable valve capable of applying oil pressure to a first end of the slider such that the slider is moved to a parking-lock-disabling position, a second openable-and-closable valve capable of applying oil pressure to a second end of the slider such that the slider is moved to a parking-lock-enabling position, a first oil passage provided with the first openable-and-closable valve, a second oil passage provided with the second openable-and-closable valve, a third oil passage through which line pressure is applied to the first end of the slider, and a fourth oil passage through which line pressure is applied to the second end of the slider. The first oil passage is provided with a second choke at which the first oil passage is narrowed such that, at a start of the hydraulic circuit, a rising characteristic of the line pressure applied through the first oil passage to the first end of the slider is lower than a rising characteristic of the line pressure applied through the second oil passage to the second end of the slider.

In the parking lock apparatus according to the third aspect of the present disclosure, the occurrence of a malfunction of the slider that may be caused if the line pressure in the first oil passage rises before the line pressure in the second oil passage rises can be prevented.

In the third aspect of the present disclosure, it is preferable that the first oil passage be provided with a second check valve in parallel with the second choke and that the second check valve prevent the oil pressure from being applied to the first end of the slider and allow the oil pressure applied to the first end of the slider to be released. In such a configuration, the oil pressure applied to the first end of the slider can be released quickly.

In the third aspect of the present disclosure, it is also preferable that the second choke be a slot provided in a separating plate. In such a configuration, there is no need to provide an additional member serving as the second choke. Consequently, the number of components can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A parking lock apparatus comprising:
 a parking gear provided on a rotating body of a transmission;
 a parking pawl that is engageable with and disengageable from the parking gear;
 a slider whose state is switchable between an engaged state in which the parking pawl is in engagement with the parking gear and a disengaged state where the parking pawl is out of engagement with the parking gear; and
 a hydraulic circuit that controls the slider,
 wherein the hydraulic circuit includes
  a first openable-and-closable valve capable of applying oil pressure to a first end of the slider such that the slider is moved to a parking-lock-disabling position;
  a second openable-and-closable valve capable of applying oil pressure to a second end of the slider such that the slider is moved to a parking-lock-enabling position;
  a first oil passage provided with the first openable-and-closable valve;
  a second oil passage provided with the second openable-and-closable valve;
  a third oil passage through which line pressure is applied to the first end of the slider; and
  a fourth oil passage through which line pressure is applied to the second end of the slider, and
 wherein the third oil passage is provided with a hydraulic cut valve that is opened when the oil pressure in the third oil passage is higher than or equal to a predetermined oil pressure that is determined by a difference, at a start of the hydraulic circuit, between the line pressure applied through the fourth oil passage to the second end of the slider and the line pressure applied through the third oil passage to the first end of the slider.

2. A parking lock apparatus comprising:
 a parking gear provided on a rotating body of a transmission;
 a parking pawl that is engageable with and disengageable from the parking gear;
 a slider whose state is switchable between an engaged state in which the parking pawl is in engagement with the parking gear and a disengaged state where the parking pawl is out of engagement with the parking gear; and
 a hydraulic circuit that controls the slider,
 wherein the hydraulic circuit includes a first openable-and-closable valve capable of applying oil pressure to a first end of the slider such that the slider is moved to a parking-lock-disabling position;
a second openable-and-closable valve capable of applying oil pressure to a second end of the slider such that the slider is moved to a parking-lock-enabling position;
a first oil passage provided with the first openable-and-closable valve;
a second oil passage provided with the second openable-and-closable valve;
a third oil passage through which line pressure is applied to the first end of the slider; and
a fourth oil passage through which line pressure is applied to the second end of the slider,
wherein the third oil passage is provided with a first choke at which the third oil passage is narrowed such that, at a start of the hydraulic circuit, a rising characteristic of the line pressure applied through the third oil passage to the first end of the slider is lower than a rising characteristic of the line pressure applied through the fourth oil passage to the second end of the slider, and
wherein the third oil passage is provided with a first check valve in parallel with the first choke.

3. The parking lock apparatus according to claim 2, wherein the first check valve prevents the oil pressure from being applied to the first end of the slider and allows the oil pressure applied to the first end of the slider to be released.

4. The parking lock apparatus according to claim 2, wherein the first choke is a slot provided in a separating plate.

5. A parking lock apparatus comprising:
a parking gear provided on a rotating body of a transmission;
a parking pawl that is engageable with and disengageable from the parking gear;
a slider whose state is switchable between an engaged state in which the parking pawl is in engagement with the parking gear and a disengaged state where the parking pawl is out of engagement with the parking gear; and
a hydraulic circuit that controls the slider,
wherein the hydraulic circuit includes
a first openable-and-closable valve capable of applying oil pressure to a first end of the slider such that the slider is moved to a parking-lock-disabling position;
a second openable-and-closable valve capable of applying oil pressure to a second end of the slider such that the slider is moved to a parking-lock-enabling position;
a first oil passage provided with the first openable-and-closable valve;
a second oil passage provided with the second openable-and-closable valve;
a third oil passage through which line pressure is applied to the first end of the slider; and
a fourth oil passage through which line pressure is applied to the second end of the slider,
wherein the first oil passage is provided with a second choke at which the first oil passage is narrowed such that, at a start of the hydraulic circuit, a rising characteristic of the line pressure applied through the first oil passage to the first end of the slider is lower than a rising characteristic of the line pressure applied through the second oil passage to the second end of the slider, and
wherein the first oil passage is provided with a second check valve in parallel with the second choke.

6. The parking lock apparatus according to claim 5, wherein the second check valve prevents the oil pressure from being applied to the first end of the slider and allows the oil pressure applied to the first end of the slider to be released.

7. The parking lock apparatus according to claim 5, wherein the second choke is a slot provided in a separating plate.

8. A parking lock apparatus comprising:
a parking gear provided to be rotatable together with a rotating body of a transmission;
a parking pawl provided to be engageable with and disengageable from the parking gear;
a slider to be switched between a parking lock position and a parking release position, the parking pawl being in engagement with the parking gear in the parking lock position, the parking pawl being out of engagement with the parking gear in the parking release position; and
a hydraulic circuit to control the slider and comprising:
a first switching valve to apply oil pressure to the slider to move the slider to the parking release position;
a second switching valve to apply oil pressure to the slider to move the slider to the parking lock position;
a first oil passage connecting the first switching valve and the slider;
a second oil passage connecting the second switching valve and the slider;
a third oil passage which is connected to the slider and through which a first line pressure is applied to push the slider toward the parking release position;
a fourth oil passage which is connected to the slider and through which a second line pressure is applied to push the slider toward the parking lock direction; and
a hydraulic cut valve provided in the third oil passage configured to be opened by an oil pressure, the oil pressure defined by a difference between the first line pressure and the second line pressure is higher than or equal to a threshold pressure when applying line pressure to the hydraulic circuit is started.

9. The parking lock apparatus according to claim 8, wherein the first switching valve is to apply the oil pressure to a first end of the slider,
wherein the second switching valve is to apply the oil pressure to a second end of the slider,
wherein the first line pressure is applied to the first end of the slider through the third oil passage, and
wherein the second line pressure is applied to the second end of the slider through the fourth oil passage.

10. The parking lock apparatus according to claim 8, wherein the line pressure in the hydraulic circuit is supplied from a hydraulic pump driven by an internal combustion engine, and
wherein the first oil passage, second oil passage, third oil passage, and fourth oil passage each extends to a respective oil chamber of an actuator in which the slider is disposed.

11. A parking lock apparatus comprising:
a parking gear provided to be rotatable together with a rotating body of a transmission;
a parking pawl provided to be engageable with and disengageable from the parking gear;
a slider to be switched between a parking lock position and a parking release position, the parking pawl being in engagement with the parking gear in the parking lock position, the parking pawl being out of engagement with the parking gear in the parking release position; and a hydraulic circuit to control the slider and comprising:
a first switching valve to apply oil pressure to the slider to move the slider to the parking release position;
a second switching valve to apply oil pressure to the slider to move the slider to the parking lock position;
a first oil passage connecting the first switching valve and the slider;
a second oil passage connecting the second switching valve and the slider;
a third oil passage which is connected to the slider and through which a first line pressure is applied to push the slider toward the parking release position;
a fourth oil passage which is connected to the slider and through which a second line pressure is applied to push the slider toward the parking lock position; and
a first choke provided in the third oil passage to narrow the third oil passage such that a rising characteristic of the first line pressure is lower than a rising characteristic of the second line pressure when applying line pressure to the hydraulic circuit is started,
wherein the third oil passage is provided with a first check valve in parallel with the first choke.

12. The parking lock apparatus according to claim 11,
wherein the first switching valve is to apply the oil pressure to a first end of the slider,
wherein the second switching valve is to apply the oil pressure to a second end of the slider,
wherein the first line pressure is applied to the first end of the slider through the third oil passage, and
wherein the second line pressure is applied to the second end of the slider through the fourth oil passage.

13. The parking lock apparatus according to claim 12,
wherein the first check valve prevents the oil pressure from being applied to the first end of the slider and allows the oil pressure applied to the first end of the slider to be released.

14. The parking lock apparatus according to claim 11,
wherein the first choke is a slot provided in a separating plate.

15. The parking lock apparatus according to claim 11,
wherein the line pressure in the hydraulic circuit is supplied from a hydraulic pump driven by an internal combustion engine, and
wherein the first oil passage, second oil passage, third oil passage, and fourth oil passage each extends to a respective oil chamber of an actuator in which the slider is disposed.

16. A parking lock apparatus comprising:
a parking gear provided to be rotatable together with a rotating body of a transmission;
a parking pawl provided to be engageable with and disengageable from the parking gear;
a slider to be switched between a parking lock position and a parking release position, the parking pawl being in engagement with the parking gear in the parking lock position, the parking pawl being out of engagement with the parking gear in the parking release position; and a hydraulic circuit to control the slider and comprising:
a first switching valve to apply oil pressure to the slider to move the slider to the parking release position;
a second switching valve to apply oil pressure to the slider to move the slider to a parking lock position;
a first oil passage connecting the first switching valve and the slider;
a second oil passage connecting the second switching valve and the slider;
a third oil passage which is connected to the slider and through which line pressure is applied to push the slider toward the parking release position;
a fourth oil passage which is connected to the slider and through which line pressure is applied to push the slider toward the parking lock direction; and
a second choke provided in the first oil passage to narrow the first oil passage such that a rising characteristic of a third line pressure applied through the first oil passage is lower than a rising characteristic of a fourth line pressure applied through the second oil passage when applying line pressure to the hydraulic circuit is started,
wherein the first oil passage is provided with a second check valve in parallel with the second choke.

17. The parking lock apparatus according to claim 16,
wherein the first switching valve is to apply the oil pressure to a first end of the slider,
wherein the second switching valve is to apply the oil pressure to a second end of the slider,
wherein the line pressure is applied to the first end of the slider through the third oil passage, and
wherein the line pressure is applied to the second end of the slider through the fourth oil passage.

18. The parking lock apparatus according to claim 17,
wherein the second check valve prevents the oil pressure from being applied to the first end of the slider and allows the oil pressure applied to the first end of the slider to be released.

19. The parking lock apparatus according to claim 16,
wherein the second choke is a slot provided in a separating plate.

20. The parking lock apparatus according to claim 16,
wherein the line pressure in the hydraulic circuit is supplied from a hydraulic pump driven by an internal combustion engine, and
wherein the first oil passage, second oil passage, third oil passage, and fourth oil passage each extends to a respective oil chamber of an actuator in which the slider is disposed.

* * * * *